Dec. 27, 1938.  V. GREY  2,141,465
TAP CHUCK
Filed Oct. 10, 1936

INVENTOR
VICTOR GREY
BY *H B Whitfield*
ATTORNEY

Patented Dec. 27, 1938

2,141,465

UNITED STATES PATENT OFFICE 2,141,465

TAP CHUCK

Victor Grey, Chicago, Ill., assignor to Teletype Corporation, Chicago, Ill., a corporation of Delaware Application October 10, 1936, Serial No. 104,962

5 Claims. (Cl. 10—135)

The present invention relates to tool holders and particularly to tapping and/or drilling chucks adapted especially for use with power-driven machines.

In motor driven machining apparatus such as tapping and drilling machines, operations are required to be executed with considerable rapidity under paced conditions prevalent in commercial manufacturing establishments. As a result, it has been found that it is difficult to regulate the arrest and reverse rotation of tapping and drilling spindles so that they may occur at the critical instants when the proper depth has been attained. Efforts to control these operations are beset with certain difficulties attributable to a large extent to momentum and incidental overrunning, which frequently results in the breakage of the drilling or tapping tools. During blind hole tapping of fine threads there is frequently caused an undercutting distortion or mutilation which is repugnant to the maintenance of accuracy and adherence to close manufacturing tolerances. An additional hazard arises when, due to improper adjustment or to some other cause, the direction reversal fails to take effect before a tap arrives at the bottom of a blind hole. The work would freeze to the tap and after spinning, might break the tap and be hurled centrifugally in any direction, endangering the operator or nearby workers. The afore-enumerated obstacles to high rate production methods of manufacture are by no means exclusive to drilling and tapping machinery, and the solution to these problems as proposed hereinafter will be understood to have application to numerous power-driven machining tools and apparatus.

Accordingly, an object of the present invention is the provision of a tool holder which is simple in construction and is adapted for high speed production machinery to afford proper accuracy and greater efficiency.

Briefly, the present invention is applicable to a reversible spindle drilling or tapping machine or to a lathe or screw cutting device in which the power-driven chuck is controlled in accordance with a depth gauge, to reverse its direction of rotation in accordance with a predetermined setting of said gauge. Because such mechanisms must necessarily embody moving parts having considerable mass, the instant of direction reversal is extremely difficult to control, with a result that small piece parts being processed, especially in thread tapping machines, are compelled to undergo considerable stresses, as a result of which fine threads may be stripped or mutilated, In the case of heavier threads, the piece parts have been known to "climb" the tap before the spindle "takes" its reversal and can be properly extracted. To overcome the cited and other objectionable conditions, an embodiment of the present invention provides a severable chuck within which a spring tends to maintain the parts in a normal position. One part of the chuck is movable longitudinally within the other in the feed or advancing direction, but is not rotatable therein. The customary irregularities of adjustment which cause an overrunning before direction reversals have been instituted are obviated by permitting of a longitudinal yield in the direction in which the chuck is operating, which movement is immediately taken up upon the reversal of direction when the movable portion of the chuck recedes, without tending to move the work from its set position.

For a more comprehensive understanding of the present invention, reference should be had to the following detailed description and to the accompanying drawing in which similar reference characters indicate corresponding parts throughout, and in which Fig. 1 is a diagrammatic illustration of a power-driven tapping machine to which an embodiment of the present invention has been applied;

Figure 1:
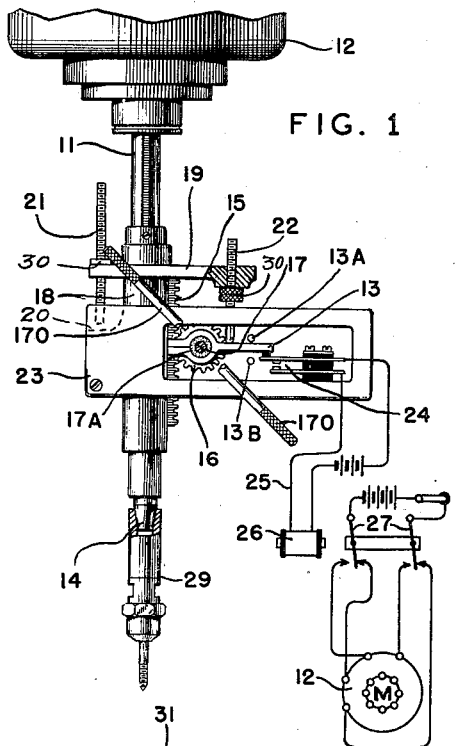

In the accompanying drawing, the reference character 11 indicates a drive shaft of a tapping machine which is driven by a two-direction driving motor 12, also indicated diagrammatically in Fig. 1. The particular illustration features a reversing motor of the single phase induction type, though conceivably the features of the present invention will find application in other type power drives and reversible drive shafts. Drive shaft 11 imparts rotation to a driving sleeve on the lower end of which there is carried a tapered stub 14 designed to be received within a chuck, having the embodiments of the present invention. To lower or raise the driving sleeve, there is provided a quill 18 which is longitudinally slidable through the supporting bracket 23 and is actuable by means of a feed rack 15 and pinion 16, the latter being secured upon a horizontal control shaft 17. By mens of the control arms 170, which are also secured to shaft 17, pinion 16 may be rotated to impart longitudinal movement to the quill 18 and accordingly cause the chuck 29 to be lowered or raised.

Carried by the quill 18 is a bracket 19 having openings through which there pass an adjustable depth stop 21 and a switch controlling rod 22. The depth stop 21 is designed to limit the movement of quill 18 during its descent, while rod 22 may be regulated so that, at a predetermined instant, its lower extremity will encounter an arm 13 which is frictionally carried upon shaft 17 preferably through the medium of a packing sleeve 17A while limited in its oscillatory movement by a pair of stop pins 13A and 13B. The rotation of shaft 17 in either direction causes arm 13 to be rocked in a similar direction until it encounters one of the pins 13A or 13B. In addition to this, control arm 13 may also be rocked clockwise by the downward action of control rod 22. By varying the position of the nuts supported by stop 21 and rod 22, the effective positions thereof for the desired operation may be varied.

At its extremity, arm 13 carries a block of insulation adapted to engage the upper of a contact pair 24 which controls a supervisory circuit 25 that determines the direction of rotation of motor 12. Upon the closure of contact pair 24, a control relay 26 is energized, causing the motor 12 to be rotated in one direction while upon the opening of contact pair 24, relay 26 is deenergized, causing motor 12 to be operated in the reverse direction. Accordingly, the control of contact pair 24 and hence the determination of the direction of rotation of motor 12 is placed under the supervision of two principal factors, (1) the direction of feeding as evidenced by the manipulation of feed arms 170, and (2) the attainment of the prearranged feed limit as evidenced by the encounter of arm 13 by the adjustable switch controlling rod 22. In this connection, it will be understood that the illustration of the motor reversing arrangement is merely by way of example and that other means for effecting a reversible drive tapping operation may be improved by the incorporation therewith of the present invention.

The quill 18 has integrally associated with it a flange or bracket 19 in which are threaded the aforementioned depth stop rod 21 and switch controlling rod 22 each with a lock nut 30 for securing it against inadvertent displacement following the adjustment thereof. The descent of the quill 18 is arrested when the lower extremity of stop rod 21 encounters a shoulder 20 formed in a stationary portion of the machine 23. When the switch control rod is properly adjusted with respect to the stop rod 21, its lower extremity engages an arm 13 supported for rotation on the packing sleeve 17A. When arm 13 moves from its upper stop pin 13A towards its lower stop pin 13B, it concurrently effects the closure of a contact pair 24, as will be described. Sleeve 17A is carried upon the shaft 17, which may be journaled in a stationary portion of the machine, such as the frame 23. When, through the operation of the manipulation arms 170, shaft 17 is rotated counterclockwise, sufficient frictional engagement is had with the journal of arm 13 to carry the latter back in a counterclockwise direction until arrested by encounter with the upper stop pin 13A. This movement of arm 13 is permitted by the ascent of rod 22, which is carried by the flange 19.

Under the conditions of operation just described, the contact pair 24 being closed, reversing relay 26 is energized causing reversing switch armature 27 to be disposed so that the motor 12 rotates drive shaft 11 in a reversing or tap-extracting direction. When the chuck 29 has been raised so that tap 53 clears the work and it is then desired to reenter a new hole for tapping, the manipulation arms 170 are rotated counterclockwise so as to effect counterclockwise movement to the supervisory shaft 17. This immediately rocks arm 13 in a counterclockwise direction permitting the contact pair 24 to come ajar. As a result, relay 26 is deenergized, armature contacts 27 permitted to return to their back contacts, and motor 12 is driven in the positive or tap-entering direction as distinguished from tap-extracting. The quill 18 is fed downwardly by the pinion 16 through the movement of shaft 17 until, upon attaining the proper depth, switch control rod 22 encounters and rocks arm 13 in a clockwise direction closing the contact pair 24 again, while immediately thereafter, as provided for by the setting adjustment of rods 21 and 22, the stop rod 21 encounters a stationary shoulder 20 arresting the descent of the quill and, therefore, of the chuck 29. By this time motor 12 will have come to rest and immediately reversed its direction to cause the tap to be turned out of the work.

It has been found that however carefully the adjustment of control rod 22 may be established with respect to the effectiveness of depth stop 21, the exact instant at which the direction of rotation is reversed may not be expected to coincide through the continuous periods of operation. Eventually either the motor is reversed before the tap has fully attained its depth or, as is more frequently the case, the motor and drive shaft 11 will be found to overrun to an extent that the continued rotation of the tap without the accompanying longitudinal movement necessary to feed into the work results in the mutilation or under-cutting of the threads and frequently even in the breaking of the tap. To safeguard against this condition, there is herewith proposed a tap holder 29 having an internal taper 31 suitable to be driven securely onto the tapered projection 14 and a central opening through which there passes a spindle 32 of a secondary chuck 33. Spindle 32 at its upper end, receives a shoulder screw 34 against which there urges one end of a compression spring 35 whose opposite end engages against a follower washer 36 which in turn abuts the end of inner wall 37 integral with the tap holder 29. The action of spring 35 is such as to maintain spindle 32 in its upper extremity whereat the shoulder 41 thrusts against the end surface 42 and the feather 38 which passes through the spindle 32 is in the upper extremity of longitudinal slot 39.

Secondary chuck 33 comprises a slightly enlarged neck 43 having flat spots 44 within which may be received the jaws of an open-end wrench for the purpose of holding the shank or spindle 32 while a chuck sleeve 45 integral with shank 32 and neck 43 receives a chuck nut 47 over its threads 46. Within the chuck sleeve 45 there is a hollow 48 into which are received the jaws 49 whose ends terminate with a tapered head 51 that cooperates with an internal taper 52 of the nut 47. The jaws 49 may be replaceable to accommodate different sizes of taps, and, to secure a tap, the nut 47 is drawn firmly over the sleeve 45 which may be securely held as aforedescribed by an open-end wrench. This movement causes internal taper 52 to draw the jaw elements 49 together, concentrically embracing between them the shank of a tap such as the one indicated 53.

During the tapping operation, when the depth stop 21 encounters the supporting bracket 23 and the rod 22 engages the contactors 24 reversing the direction of motor 12, any overrunning of the driving assembly averts the condition of imparting the vertical strain on the work by permitting instead a yield within the tap holder 29 as a result of which spindle 32 moves down, compressing the spring 35. Accordingly, it will be understood that the tension of the compression spring 35 will be preferably sufficient only to maintain secondary chuck 33 and its spindle 32 in the normal position and not to resist appreciably the movement of the assembly in following the tap 53 as a result of the aforedescribed overrunning condition.

The principal or characteristic feature of the present invention resides in the provision of the longitudinally movable secondary chuck 33 and the spring yield 35 which permits its motion in the forward direction; that is to say, in the direction in which the tap is inclined to advance during its effectiveness, or when it is moving forward into the work. In another disclosure herewith and in the following description there will be revealed by illustration the manner in which the present invention is adaptable to auxiliary tap features.

A further utility which results from the tap construction just described is manifest following an executed operation and during withdrawal. As is well known, the rate of movement of a tap during its withdrawal is the same as that during its feeding, and when this operation is executed or is attempted to be executed more rapidly than the prescribed rate of movement, there would ordinarily result some damage to the already cut threads. Throughout continuous production periods, an operator may, on occasions, be inclined to urge the withdrawal movement faster than the tap is able to feed out. By means of the yield afforded in spring 35, any inadvertent handling in this manner will be absorbed and accordingly will be prevented from damaging the work.

*Modification*

Figure 2:
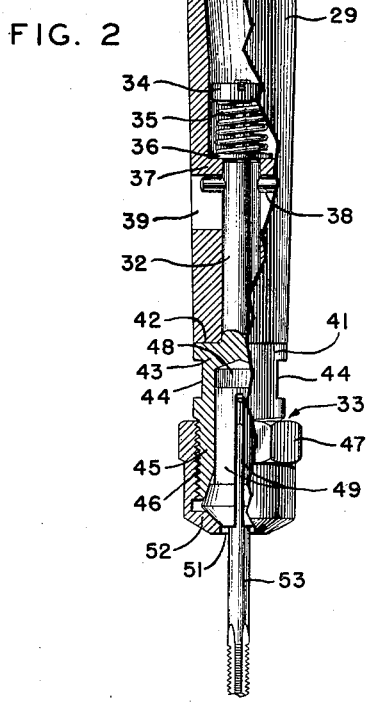
Fig. 2 is a detail side elevation of an improved tapping chuck showing a portion thereof in section.
Figure 3:
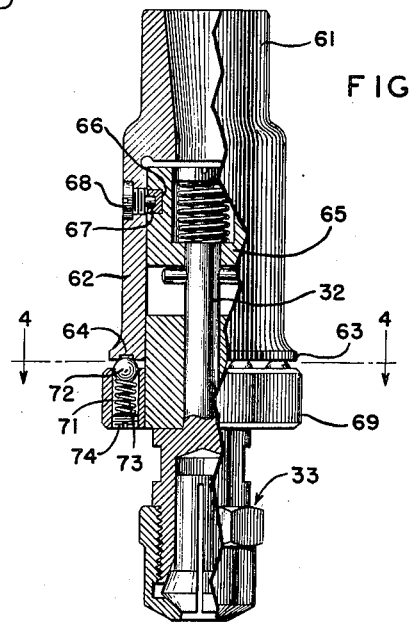
Fig. 3 is a side elevation of a modified tapping chuck having portions thereof broken away and partially in section.

In Fig. 3 there is disclosed a modified tap holder 61 which is likewise receivable upon a stub 14 and which is provided with certain ones of the afore-enumerated elements described in connection with Fig. 2 but which, in addition, contemplates a breakdown clutch that may be adjustable to limit the driving torque imparted to the secondary chuck 33. This embodiment contemplates a tap holder 61 which terminates with a sleeve section 62 having a bell flange or flare 63 whose end surface is provided with a series of recesses 64 and which sleeve section 62 is designed to envelop the spindle collar 65 within which there is received the spindle 32. The collar 65 is provided near its upper extremity with an annular groove 66 within which reside a number of ring segments held by the dowel projections 67 of a plurality of shoulder screws 68 peripherally aligned and passing through the sleeve section 62 opposite annular groove 66.

A girdle 69 is secured to the spindle collar 65 by means of set screws 75, and within a plurality of wells 71 which correspond in number and spacing to the recesses 64 of sleeve section 62 there are assembled in order, the steel balls 72, compression spring 73, and set screws 74. The diameter or depth of the recesses 64 and the balls 72 is such that the latter are received within said recesses to a slight extent only, and in any event less than one-half the spherical body of their associated balls 72. Also, the tension of the springs 73 is regulated so that all are approximately equal and in accordance with the engagement between the balls 72 and their recesses 64 so as to yield to a predetermined resistance, causing the balls 72 collectively to be cammed out of their respective recesses. Thus, in the event of any resistance to rotation such as may result from the jamming of a tap 53 when it arrives at the bottom of a blind hole, the driving force is broken at the clutch elements or balls 72, permitting the assembly comprising secondary chuck 33, its spindle 32, spindle collar 65, and girdle 69 to become disengaged from the driving tap holder 61, averting thereby any damage which would otherwise result.

The breakdown drive clutch just described may be regulated so as to be effective upon predetermined driving resistance. This safety feature is particularly important during heavier tapping operations during which a failure on the part of the reversing switch to become effective might result in the hurling of the work centrifugally, endangering not only the particular operator but also adjacent ones.

Figure 5:
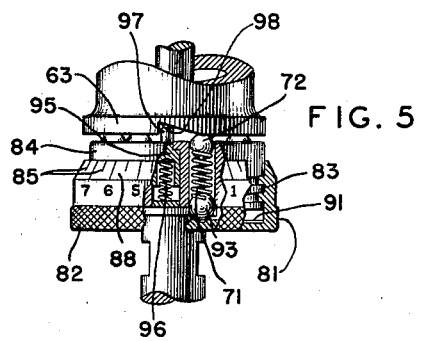
Fig. 5 is a detail side elevation, with portions broken away, of a modified tapping chuck.
Figure 4:
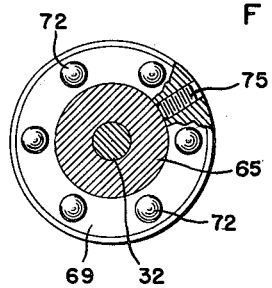
Fig. 4 is a transverse sectional view taken approximately on line 4—4 of Fig. 3.

In the modified illustration, Fig. 5, there is featured a tap construction resembling generally the one illustrated in Fig. 3. In this case, however, the girdle 81 is knurled as at 82 and is threaded at 83 to an inner collar 84. Within the wells 71 there are provided, in addition to the detent balls 72, oppositely disposed detent balls 93 which, by cooperating with the serrations 91, contribute a mild resistance to the relative movement between girdle 81 and collar 84. By an effort which will overcome the checking effect of the secondary detent balls 93, girdle 81 may be moved with respect to collar 84, and thereby the tension of the several principal detent balls 72 may be simultaneously adjusted. Preferably, a set of engraved markings 85 are applied on the beveled outer surface of girdle 81 by which the relative position between it and collar 84 may be discerned to establish desired torque. It is proposed that the peripheral markings 85 of girdle 81 be calibrated in accordance with the prerequisite torques of various sizes of taps, so that for a given hardness of material, an operator may, by referring to a chart, know precisely the ideal adjustment of girdle 81.

The breakdown effect of the overload clutch is frequently desirable only in the direction of thread cutting and not in the direction of tap extraction. Accordingly, there is provided in the modified showing of Fig. 5 a positive clutch pin 95 hollowed out to harbor a spring coil 96 that urges it outwardly so that its nose 97 may abut squarely the shoulder 98 of bell flange 63 when the direction of rotation is suitable to that purpose. During the opposite direction of rotation, which corresponds to the cutting direction as distinguished from the extraction direction, the nose 97 is cammed out by the inclination 98 of the notch in bell flange 63.

While the present invention has been explained and described with reference to specifically defined embodiments, it will be understood that numerous variations and modifications may be made without departing from the spirit of

What is claimed is:

1. A chuck holder comprising a driving member having a plurality of spaced clutch engagement recesses, a driven member having a plurality of correspondingly spaced recess engaging elements, a chuck associated with said driven member adapted to grip threading taps, a spindle associated with said chuck, spring-urged into receding position within said driven member, and means for permitting limited longitudinal movement of said chuck and spindle in an advancing direction.

2. A tapping unit to be applied to a power-driven machine comprising a main body having endwise thereof clutch element engaging recesses, an intermediate body concentrically supported within said main body for free rotation therein, a clutch engagement device carried by said intermediate body having a plurality of clutch engaging elements spaced to align with said recesses, and a central body concentrically supported within said intermediate body for limited longitudinal movement therein including a spindle having a transverse spline movable within a transverse notch in said intermediate body.

3. A tapping unit to be applied to a power-driven machine comprising a main body having endwise thereof clutch element engaging recesses, an intermediate body concentrically supported within said main body for free rotation therein, a clutch engagement device carried by said intermediate body having a plurality of clutch engaging elements spaced to align with said recesses, and a central body concentrically supported within said intermediate body for limited longitudinal movement therein including a spindle having a transverse spline movable in the direction of advancement within a transverse notch in said intermediate body.

4. A machine tool comprising a drive shaft, a reversible direction electric motor for actuating said drive shaft, a driven shaft coupled to said drive shaft including a spline connection therebetween for permitting the longitudinal movement of the driven shaft with respect to said drive shaft, a quill on said driven shaft, a rack and pinion for longitudinally moving said quill and said driven shaft, an adjustable stop carried by said quill and abutting a fixed object to limit the movement of said quill and said driven shaft, an adjustable switch controlling member carried by said quill for reversing the direction of said motor after the attainment by said quill of a predetermined distance of longitudinal movement, and a tool holding chuck carried by said driven shaft.

5. In a chuck holder, a driving member having a plurality of spaced engagement apertures, a driven member having a corresponding plurality of spaced engaging elements, spring means for urging said engaging elements into said apertures, means for varying the tension of said spring means, an additional aperture in said driving member, and spring loaded engagement means in said driven member having unidirectional positive engagement in said additional aperture.

VICTOR GREY.